United States Patent
Noguchi et al.

(10) Patent No.: US 7,181,094 B2
(45) Date of Patent: Feb. 20, 2007

(54) APPARATUS FOR CONTROLLING ACOUSTO-OPTIC TUNABLE FILTER AND METHOD OF SELECTING WAVELENGTH

(75) Inventors: Masaji Noguchi, Yokohama (JP);
Tomohiro Ueno, Yokohama (JP);
Hiroyasu Ito, Yokohama (JP);
Hideyuki Miyata, Kawasaki (JP);
Yutaka Kai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/213,955

(22) Filed: Aug. 30, 2005

(65) Prior Publication Data

US 2006/0269185 A1 Nov. 30, 2006

(30) Foreign Application Priority Data

May 27, 2005 (JP) ............................. 2005-156304

(51) Int. Cl.
*G02F 1/335* (2006.01)
*H04J 14/02* (2006.01)
*H04B 10/00* (2006.01)

(52) U.S. Cl. ............................. 385/7; 398/82; 398/195
(58) Field of Classification Search ..................... None
See application file for complete search history.

(56) References Cited

U.S. PATENT DOCUMENTS 6,351,323 B1    2/2002   Onaka et al.
6,538,782 B1    3/2003   Otsuka et al.
6,583,900 B2 *  6/2003   Onaka et al. ................. 398/59
2004/0190904 A1  9/2004  Noguchi et al.
2004/0197099 A1  10/2004 Kai et al.
2006/0189281 A1* 8/2006  Noguchi et al. ............ 455/123

FOREIGN PATENT DOCUMENTS

| JP | 11-98122    | 4/1999  |
| JP | 11-218790   | 8/1999  |
| JP | 11-289296   | 10/1999 |
| JP | 2000-241782 | 9/2000  |
| JP | 2003-344817 | 12/2003 |
| JP | 2004-260747 | 9/2004  |
| JP | 2004-282690 | 10/2004 |

* cited by examiner

*Primary Examiner*—Sung Pak
*Assistant Examiner*—Tina M. Young
(74) *Attorney, Agent, or Firm*—Staas & Halsey LLP

(57) ABSTRACT

A radio-frequency-signal generator generates an RF signal. An optical monitor monitors a first intensity of a reference signal and a second intensity of a drop signal. A reference-frequency determining unit determines, based on the first intensity, a first frequency of an RF signal that causes the AOTF to output the reference signal. A temperature detecting unit detects a temperature of the AOTF. A frequency calculating unit calculates a second frequency of an RF signal that causes the AOTF to output a drop signal of a desired wavelength. A control unit controls the RF-signal generator to generate the RF signal of the second frequency calculated.

6 Claims, 8 Drawing Sheets

FIG.5A

| TEMPERATURE $T_{AOTF}$ OF AOTF (°C) | 5 | 25 | 45 | 65 | 85 |
|---|---|---|---|---|---|
| FREQUENCY INTERVAL $\Delta F$ OF RF SIGNAL (KHZ) | 97.6 | 96 | 94.4 | 92.8 | 91.2 |

APPARATUS FOR CONTROLLING ACOUSTO-OPTIC TUNABLE FILTER AND METHOD OF SELECTING WAVELENGTH

CROSS-REFERENCE TO RELATED APPLICATIONS

This application is based upon and claims the benefit of priority from the prior Japanese Patent Application No. 2005-156304, filed on May 27, 2005, the entire contents of which are incorporated herein by reference.

BACKGROUND OF THE INVENTION

1. Field of the Invention

The present invention relates to a technology for controlling an acousto-optic tunable filter (AOTF) having a temperature characteristic. More particularly, the present invention relates to a technology for causing the AOTF to selectively output a signal of a predetermined wavelength by correcting the frequency deviation, which is due to the temperature characteristic, of a radio-frequency (RF) signal to be input to the AOTF.

2. Description of the Related Art

With a purpose of building a multimedia network, an optical communication device that enables long distance transmission of large-amount data has been demanded. To achieve increased data-transmission capacity, research and development on a wavelength-division multiplexing (WDM) has been carried out because the WDM has advantage in which a broadband property or a large capacity property of an optical fiber can be efficiently utilized.

In the optical communication network, a function of transmitting, dropping and adding an optical signal at each point on the network as necessary, an optical routing function for selecting an optical transmission path, and a cross-connect function are necessary. For this reason, an optical add/drop multiplexer (OADM) that transmits, drops, and adds an optical signal has been developed. The OADM includes a fixed-wavelength type and a selectable-wavelength type. The fixed-wavelength type can add/drop only an optical signal having a fixed wavelength. The selectable-wavelength type can add/drop an optical signal having an arbitrary wavelength.

Conventionally, an acousto-optic tunable filter (AOTF) is used to realize an OADM of the selectable-wavelength type. The AOTF acts as to extract only a light having a selected wavelength. Therefore, unlike a fiber grating in which a selected wavelength is fixed, it is possible to arbitrarily select a wavelength. Since the AOTF functions as a tunable wavelength-selecting filter, the AOTF can be applied to a tunable wavelength-selecting filter for a tributary station that adds/drops an optical signal between terminal stations. With such reasons, the OADM using the AOTF is being developed (see, for example, Japanese Patent Application Laid-Open No. H11-218790).

In the AOTF, a radio frequency signal (hereinafter, "RF signal") having a frequency band of 160 megahertzs (MHz) to 180 MHz applied to the AOTF functions as a control signal, and the AOTF outputs an optical signal according to the frequency. However, since the AOTF has temperature-dependent properties, even if an identical RF signal is applied to the AOTF, a wavelength of an optical signal to be output varies depending on temperature. Therefore, an AOTF subsystem to obtain an RF signal to output a desirable wavelength based a reference light having a predetermined wavelength output from a reference light source has been proposed.

However, as described above, with the AOTF, even if an RF signal has an identical frequency, the wavelength of the optical signal to be output varies if ambient temperature changes. Thus, a wavelength that can be obtained also changes, specifically, the wavelength obtained shifts 0.8 nanometer (nm) as the ambient temperature changes each 1° C. This amount of wavelength shift reaches an amount of interval between the selected wavelength and adjacent wavelengths.

In a method of selecting a wavelength in the AOTF subsystem described above, preparing a reference light having the shortest wavelength and a reference light having the longest wavelength, and by tracking the reference wavelengths, a desirable frequency of the RF signal is calculated based on number of wavelengths and difference between RF frequencies of the reference lights. However, in this method, it is necessary to prepare two reference light sources. As a result, cost increases.

Moreover, there is another problem if wavelength selection is to be performed only with a single reference light source, that is, temperature-dependent frequency-pulling effect. FIG. 7 is a schematic for illustrating the temperature-dependent frequency-pulling effect of an AOTF of a dropping type.

A chart 701 illustrates a wavelength arrangement for output signals λ1 to λn and reference lights λref1 and λref2 when a WDM signal is input to an input port and the reference lights are input to ports for a reference light of the AOTF. As shown in the chart 701, the WDM transmission signal is formed with optical signals having a frequency interval (grid) of 100 gigahertz (GHz). For example, in a wavelength light having a C band (1530 nm to 1565 nm), 32 optical signals are multiplexed. The reference light λref1 has a wavelength keeping the wavelength interval of 100 GHz from the optical signal λ1 having the shortest wavelength. Similarly, the reference light λref2 has a wavelength keeping the wavelength interval of 100 GHz from the optical signal λn having the longest wavelength.

A chart 702 illustrates a wavelength arrangement for the optical signals λ1 to λn and the reference lights λref1 and λref2 when the optical signal λ2 is output from one of output ports of the AOTF when the temperature of the AOTF is 25° C. A solid line indicates the optical light being output and broken lines indicate optical lights not being output and the reference lights.

A chart 703 illustrates a frequency arrangement for RF signals F1 to Fn and Fref1 and Fref2 to output the optical signals and the reference lights input to the AOTF. A solid line shown in the chart 703 indicates the RF signal F2 that is applied to the AOTF when the optical signal λ2 shown in the chart 702 is to be output. The RF signals F1 to Fn are RF signals to output the optical signals λ1 to λn when temperature of the AOTF is 25° C. Since the optical signals are arranged at regular intervals, the RF signals are also arranged at regular intervals of Δf1. Each of the optical signals shown in the chart 702 with the broken lines are output by applying the RF signal corresponding to each of the optical signals.

However, when the temperature of the AOTF changes, relationship between a frequency of the RF signal to be applied and a wavelength of the optical signal to be output also changes. A chart 704 illustrates frequencies of RF signals F1' to Fn' and Fref1' and Fref2' when the output signal λ2 is output from one of the output ports when the temperature of the AOTF is 45° C. An RF signal F2' shown with a solid line is the RF signal to output the optical signal λ2. The RF signals F1' to Fn' and Fref1' and Fref2' with broken lines are RF signals to output each of the optical signals and the reference lights. The RF signals F1' to Fn' and the Fref1' and Fref2' are arranged at regular intervals of Δf2 to output the optical signals arranged at the regular interval of 100 GHz. The interval Δf2 is smaller than the interval Δf1, which is an interval at which the RF signals are arranged when the temperature of the AOTF is 25° C.

Thus, when the temperature increases from 25° C. to 45° C., a frequency interval of the RF signals to output an optical signal having an identical frequency changes from Δf1 to Δf2 (Δf2<Δf1). Such a phenomenon is the temperature-dependent frequency-pulling effect. There is a problem caused by the temperature-dependent frequency-pulling effect when the wavelength selection is to be achieved only with a single reference-wavelength light source.

SUMMARY OF THE INVENTION

It is an object of the present invention to solve at least the above problems in the conventional technology.

An apparatus according to an aspect of the present invention controls an acousto-optic tunable filter. The acousto-optic tunable filter includes a plurality of input ports for a reference signal and a wavelength-division-multiplexed signal, and a plurality of output ports for the reference signal and a drop signal dropped from the wavelength-division-multiplexed signal. The apparatus includes: a radio-frequency-signal generator that generates a radio-frequency signal; an optical monitor that monitors a first intensity of the reference signal and a second intensity of the drop signal output from the output ports; and a field-programmable gate array. The field-programmable gate array includes a reference-frequency determining unit that determines, based on the first intensity, a first frequency of the radio-frequency signal that causes the acousto-optic tunable filter to output the reference signal; a temperature detecting unit that detects a temperature of the acousto-optic tunable filter; a frequency calculating unit that calculates a second frequency of the radio-frequency signal that causes the acousto-optic tunable filter to output a drop signal of a desired wavelength based on the second intensity, the first frequency, the temperature detected, and a temperature-dependent output characteristic of the acousto-optic tunable filter measured in advance; and a control unit that controls the radio-frequency-signal generator to generate the radio-frequency signal of the second frequency calculated.

A method according to another aspect of the present invention is a method of selecting an acousto-optic tunable filter. The acousto-optic tunable filter includes a plurality of input ports for a reference signal and a wavelength-division-multiplexed signal, and a plurality of output ports for the reference signal and a drop signal dropped from the wavelength-division-multiplexed signal. The method includes: generating a radio-frequency signal; monitoring a first intensity of the reference signal and a second intensity of the drop signal output from the output ports; determining, based on the first intensity, a first frequency of the radio-frequency signal that causes the acousto-optic tunable filter to output the reference signal; detecting a temperature of the acousto-optic tunable filter; calculating a second frequency of the radio-frequency signal that causes the acousto-optic tunable filter to output a drop signal of a desired wavelength based on the second intensity, the first frequency, the temperature detected, and a temperature-dependent output characteristic of the acousto-optic tunable filter measured in advance; and generating the radio-frequency signal of the second frequency calculated.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 5A is a table of a frequency interval AF between RF signals when temperature ($T_{AOTF}$) of the AOTF varies;

DETAILED DESCRIPTION OF THE PREFERRED EMBODIMENTS

Exemplary embodiments of the present invention will be explained in detail with reference to the accompanying drawings.

Figure 1:
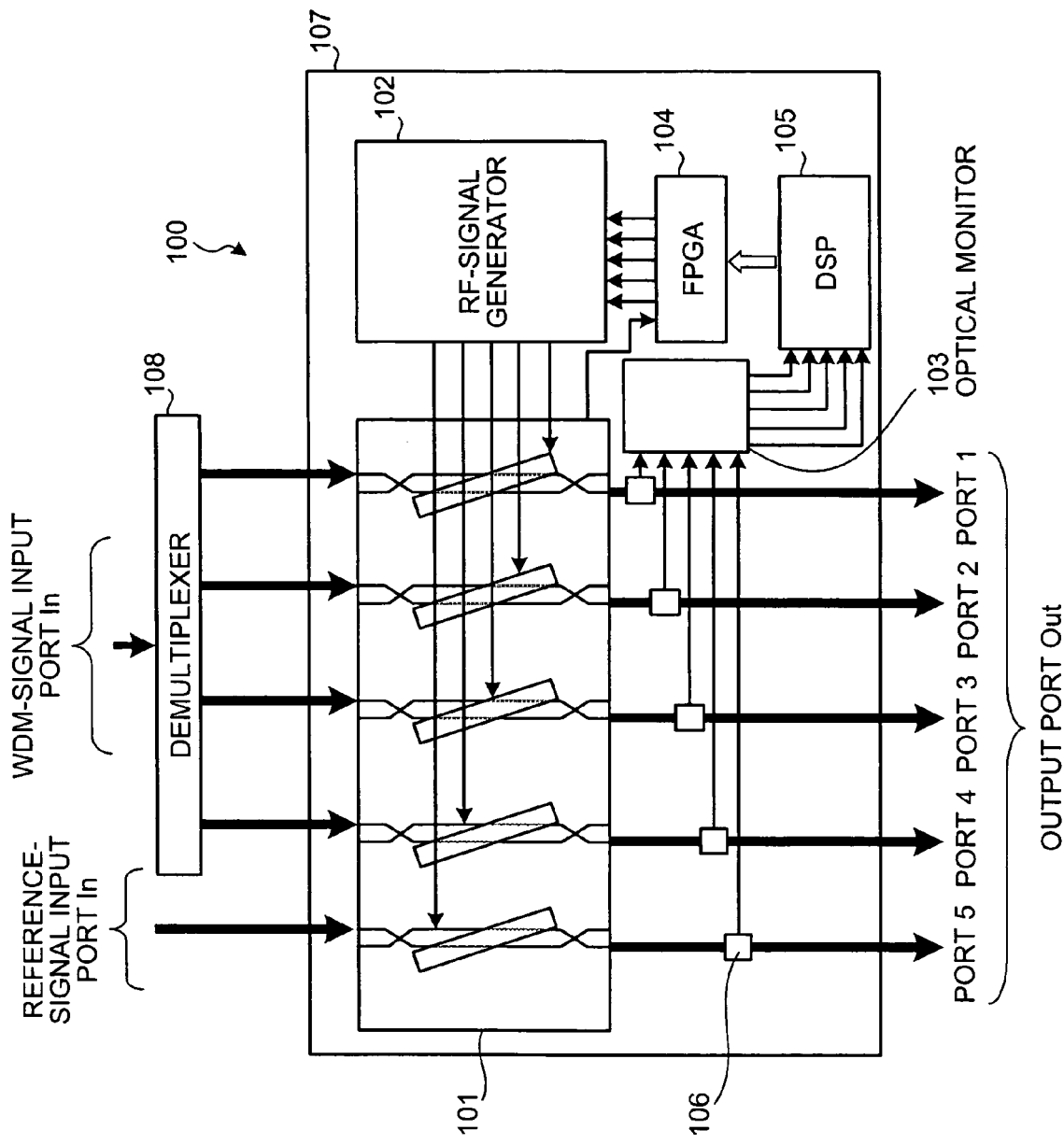
FIG. 1 is a schematic of an acousto-optic tunable filter (AOTF) control device according to an embodiment of the present invention.

FIG. 1 is a schematic of an AOTF control device 100 according to an embodiment of the present invention. As shown in FIG. 1, the AOTF control device 100 includes an optical filter unit 107 and a demultiplexer 108. The optical filter unit 107 includes an AOTF 101 of an integrated dropping type, an RF-signal generator 102, an optical monitor 103, a field-programmable gate array (FPGA) 104, a digital signal processor (DSP) 105, and an optical tap 106.

The AOTF control device 100 can control the AOTF 101 to output only an optical signal having a predetermined wavelength from among plural optical signals (λ1 to λn) input through a WDM-signal input port In to any one of ports 1 to 4. A reference light λref is for controlling the RF signal to be applied to the AOTF 101. The reference light λref is input through a reference-signal input port In to apply an RF signal to be a reference to the AOTF 101, and then, the reference light λref is output through a port 5. The ports 1 to 5 are an optical-signal output port Out.

The RF-signal generator 102 generates the RF signal to be applied to the AOTF 101. The optical monitor 103 monitors an optical signal output to each output port.

The FPGA 104 is a programmable large-scale-integration (LSI). The FPGA 104 calculates a frequency of the RF signal to output an optical signal having a predetermined wavelength, and inputs a signal for instructing generation of the RF signal to the RF-signal generator 102. A value that indicates temperature of the AOTF 101 that has been input to the FPGA 104 is used as a variable in the calculation. The DSP 105 performs a switching control of the RF signal applied from the RF-signal generator 102 based on values of the optical signal and the reference light that are obtained by monitoring. The optical tap 106 splits each of the optical signals output to the ports 1 to 4 and the reference light output to the port 5 to output to the optical monitor 103.

Figure 2:
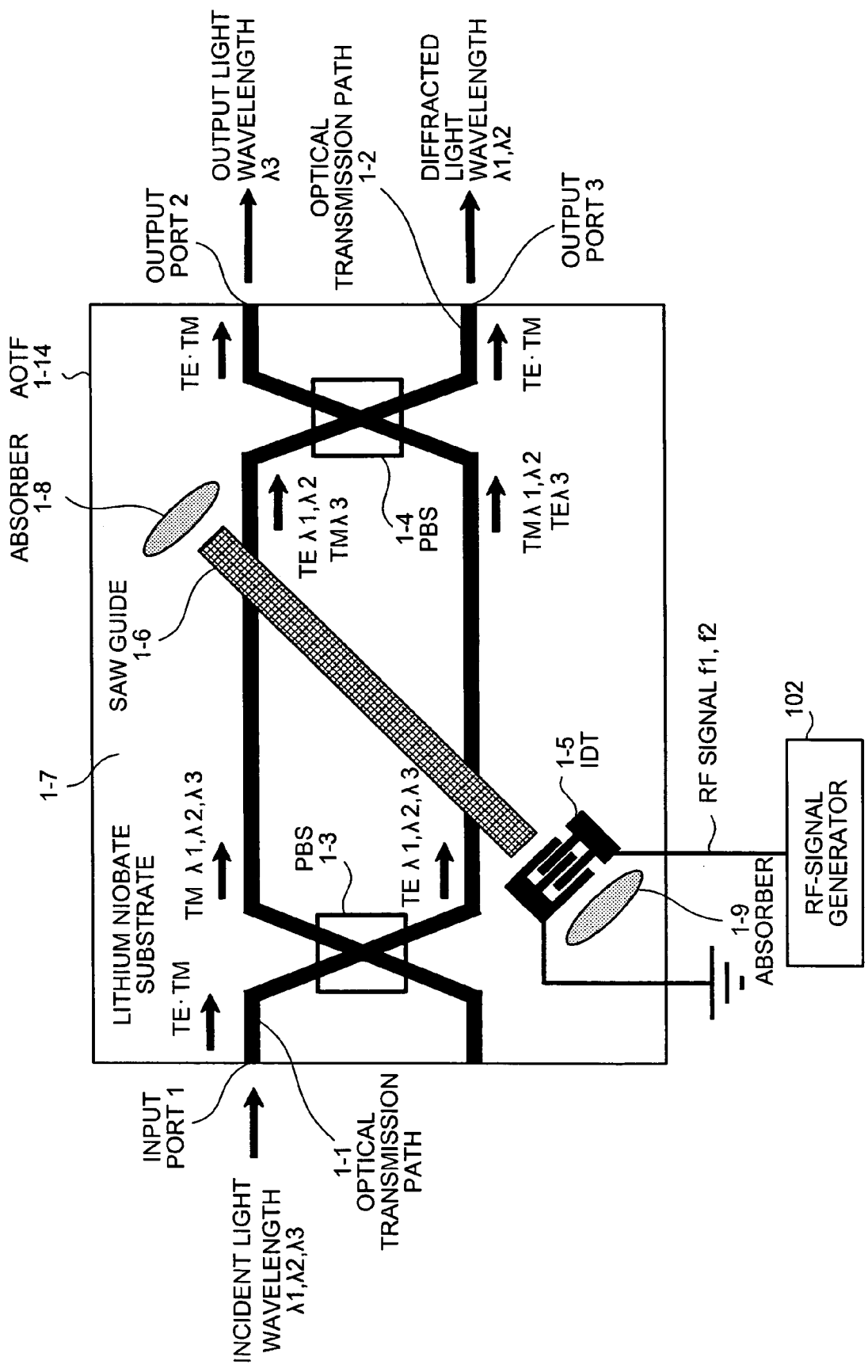
FIG. 2 is a schematic of an AOTF.

FIG. 2 is a schematic of an AOTF. The AOTF is a ferroelectric crystal, and includes a substrate 1-7 of lithium niobate (LiNbO3), which is piezoelectric, and two optical waveguides 1-1 and 1-2 formed by titanium diffusion, as shown in FIG. 2. The optical waveguides 1-1 and 1-2 cross each other at two points. At the two points, polarization beam splitters (PBS) 1-3 and 1-4 of a waveguide type are provided. Over the optical waveguides 1-1 and 1-2, a saw guide 1-6, which is a metallic film, is formed as shown in FIG. 2. A surface acoustic wave propagates through the saw guide 1-6. The surface acoustic wave is generated when the RF signal is applied to an interdigital transducer (IDT) 1-5, which is an electrode having teeth engaged with each other.

As shown in FIG. 2, when lights having wavelengths λ1 to λ3 are input to the port 1 of the AOTF, the light having both polarized modes of a transverse electric (TE) mode and a transverse magnetic (TM) mode is split into a light in the TE mode and a light in the TM mode to propagate along the optical waveguides 1-1 and 1-2 respectively. When the surface acoustic wave generated by applying an RF signal f1 having a predetermined frequency propagates through the saw guide 1-6, refractive indexes of the optical waveguides 1-1 and 1-2 periodically change due to an acousto-optic (AO) effect at portions at which each of the optical waveguides 1-1 and 1-2 crosses with the saw guide 1-6.

Thus, among the lights input, only in a light having a predetermined wavelength that interacts with such a periodic change of the refractive index, the polarized mode rotates to be switched between the TE mode and the TM mode. The TE mode is a waveguide mode that does not have an electric field in a direction of propagation, and the TM mode is a waveguide mode that does not have a magnetic field in a direction of an electric field. An amount of rotation of the polarized mode is proportional to a length of the interaction between a light in the TE mode or in the TM mode and the change of the refractive index, and to a power of the RF signal. The length of the interaction is controlled by an interval between absorbers 1-8 and 1-9 that are formed over the optical waveguides 1-1 and 1-2 to absorb the surface acoustic wave.

In other words, with optimized length of the interaction and optimized power of the RF signal, the light in the TM mode is converted into the light in the TE mode in the optical waveguide 1-1, and the light in the TE mode is converted into the light in the TM mode in the optical waveguide 1-2. The PBS 1-4 changes directions of propagation of the light in the TE mode and the light in the TM mode obtained by conversion, and only the light having the wavelength that has interacted with the change is selected as a split light. A light having a wavelength that has not interacted with the change pass through and is output through an output port 2 as an output light. In an example shown in FIG. 2, optical signals having wavelengths λ1 and λ2 are acted on by RF signals f1 and f2, therefore, are selected as the split lights to be output through an output port 3.

Thus, with the AOTF, it is possible to select only a light having a wavelength corresponding to a frequency of the RF signal to be split. The light to be selected can be changed to a light having a different wavelength by changing the frequency of the RF signal. In addition, since the output light output from the output port 2 is an optical signal from which the light having the wavelength corresponding to the frequency of the RF signal is removed, the AOTF is regarded as having a rejection function. The AOTF 101 of the integrated dropping type is formed by integrating five pieces of the AOTFs explained above.

Figure 3:
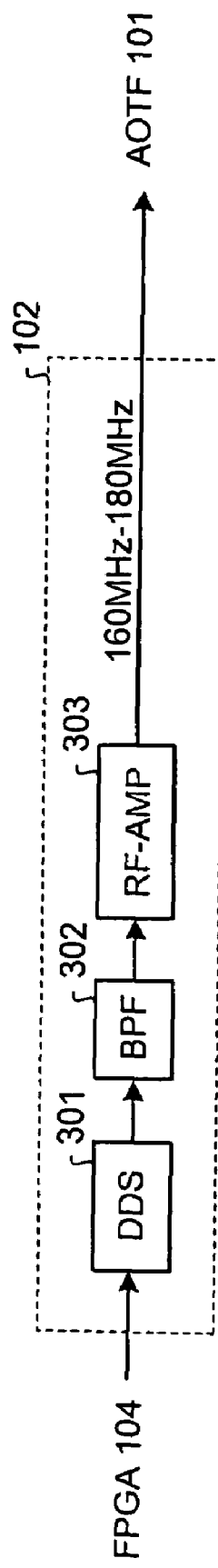
FIG. 3 is a block diagram of a radio-frequency (RF)-signal generator.

FIG. 3 is a block diagram of the RF-signal generator 102. The RF-signal generator 102 includes a direct digital synthesizer (DDS) 301, a band-pass filter (BPF) 302, and a radio frequency amplifier (RF-AMP) 303.

The DDS 301 outputs a sine wave signal or a cosine wave signal according to information for setting a frequency, a phase, or an amplitude that is input from the FPGA 104. The BPF 302 allows only a signal having a frequency within a predetermined frequency band to pass through. The RF-AMP 303 amplifies the signal input from the BPF 302 to output the RF signal to the AOTF 101. A frequency of the RF signal output from the RF-signal generator 102 is controlled by the BPF 302 to be from 160 MHz to 180 MHz.

Figure 4:
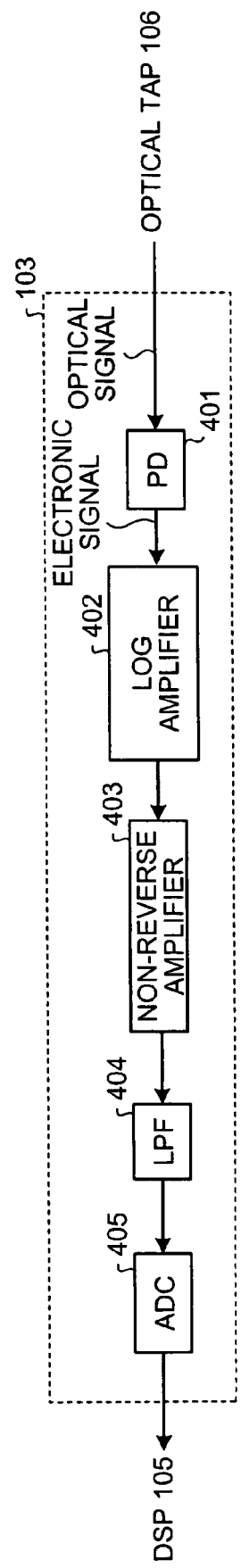
FIG. 4 is a block diagram of an optical monitor.

FIG. 4 is a block diagram of the optical monitor 103. The optical monitor 103 includes a photo diode (PD) 401, a log amplifier 402 for current-voltage conversion, a non-reverse amplifier 403, a low-pass filter (LPF) 404, and an analog-to-digital converter (ADC) 405.

The PD 401 generates an electric current to convert an optical signal split by the optical tap 106 into an electric signal. The electric current to be generated by the PD 401 corresponds to a light input to the optical monitor 103. The log amplifier 402 converts the electric current input from the PD 401 into a voltage according to a characteristic of a log. The non-reverse amplifier 403 amplifies the voltage applied from the log amplifier 402. The LPF 404 allows only a low-frequency component to pass though. Therefore, a high-frequency component of the voltage is removed. The ADC 405 converts an analog signal indicating the voltage output from the LPF 404 into a digital signal to output to the DSP 105.

According to the present invention, with the AOTF control device 100 structured as described above, it is possible to perform wavelength selection on the WDM transmission signal to output an optical signal having a desirable wavelength.

Figure 5B:
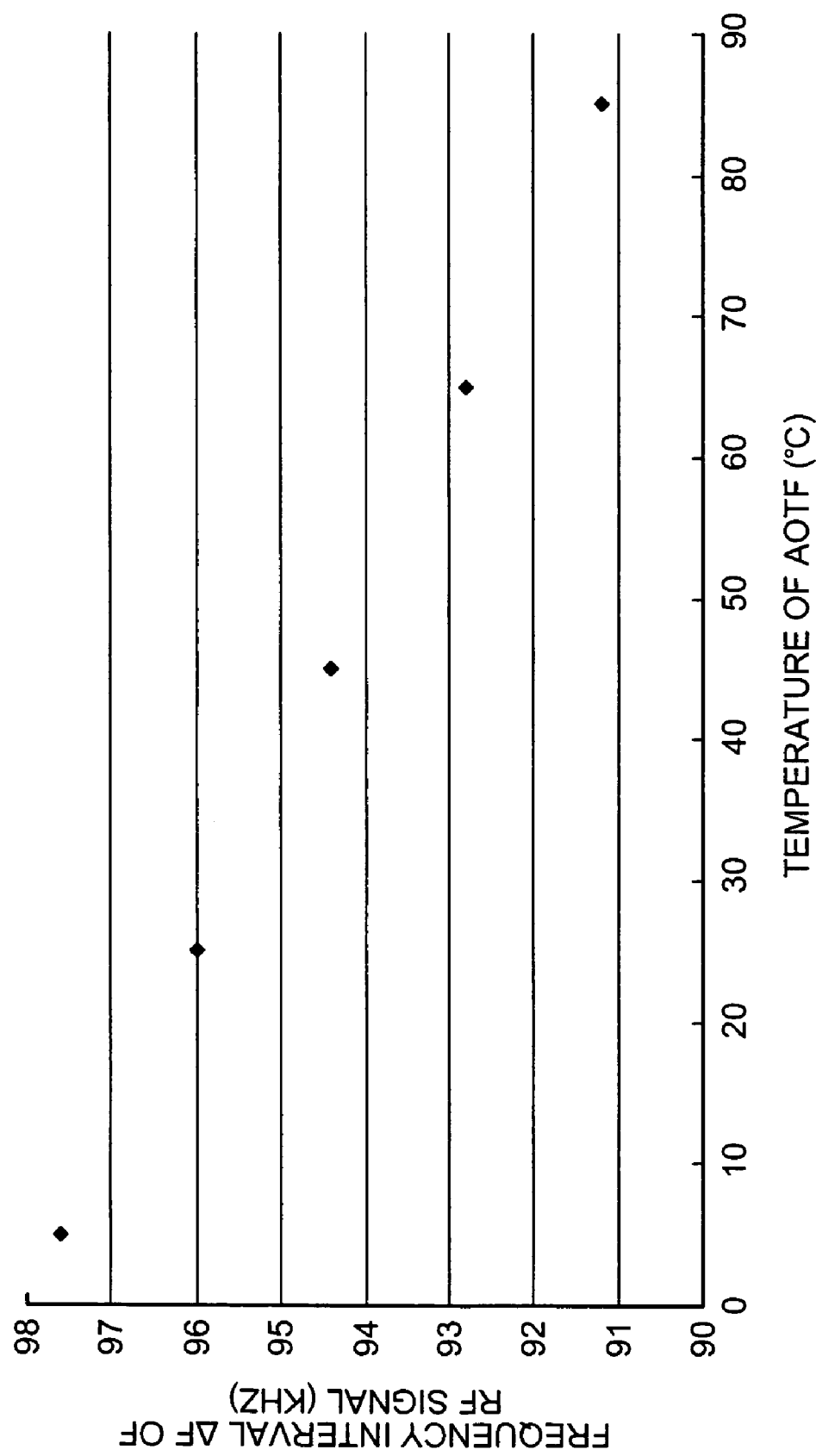
FIG. 5B is a plot of the temperature and the frequency interval.

FIG. 5A is a table of a frequency interval AF between RF signals when temperature $T_{AOTF}$ of an AOTF of an integrated dropping type varies. The frequency interval AF indicates an interval between frequencies of RF signals to output optical signals arranged at regular intervals of 100 GHz. FIG. 5B is a plot of the temperature and the frequency interval. In FIG. 5B, a vertical axis represents the frequency interval ΔF (Hz) and a horizontal axis represents the temperature (° C.) of the AOTF 101 shown in FIG. 1, and the frequency interval AF corresponding to the temperature shown in FIG. 5A is plotted.

As described for the conventional technology, the AOTF has the temperature-dependent frequency-pulling effect. Therefore, as the temperature of the AOTF 101 increases, the frequency interval ΔF decreases. As shown in the plot shown in FIG. 5B, a change in the frequency interval ΔF due to the temperature-dependent frequency-pulling effect is linear. Accordingly, in the embodiments of the present invention, a frequency of the RF signal to output an optical signal having a desirable wavelength is calculated using the plot shown in FIG. 5B to achieve the wavelength selection.

Figure 6:
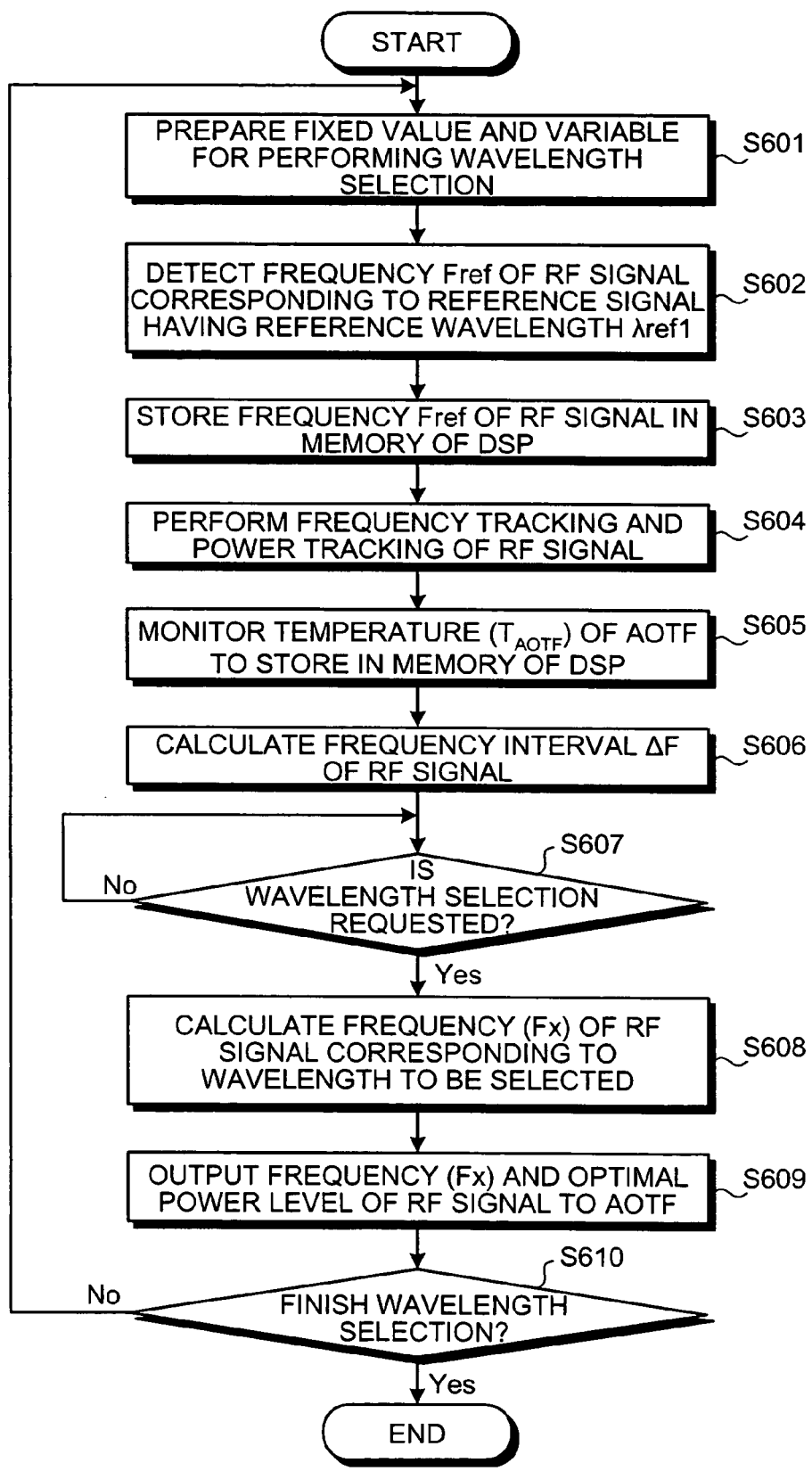
FIG. 6 is a flowchart of a wavelength selection performed by the AOTF control device.
Figure 7:
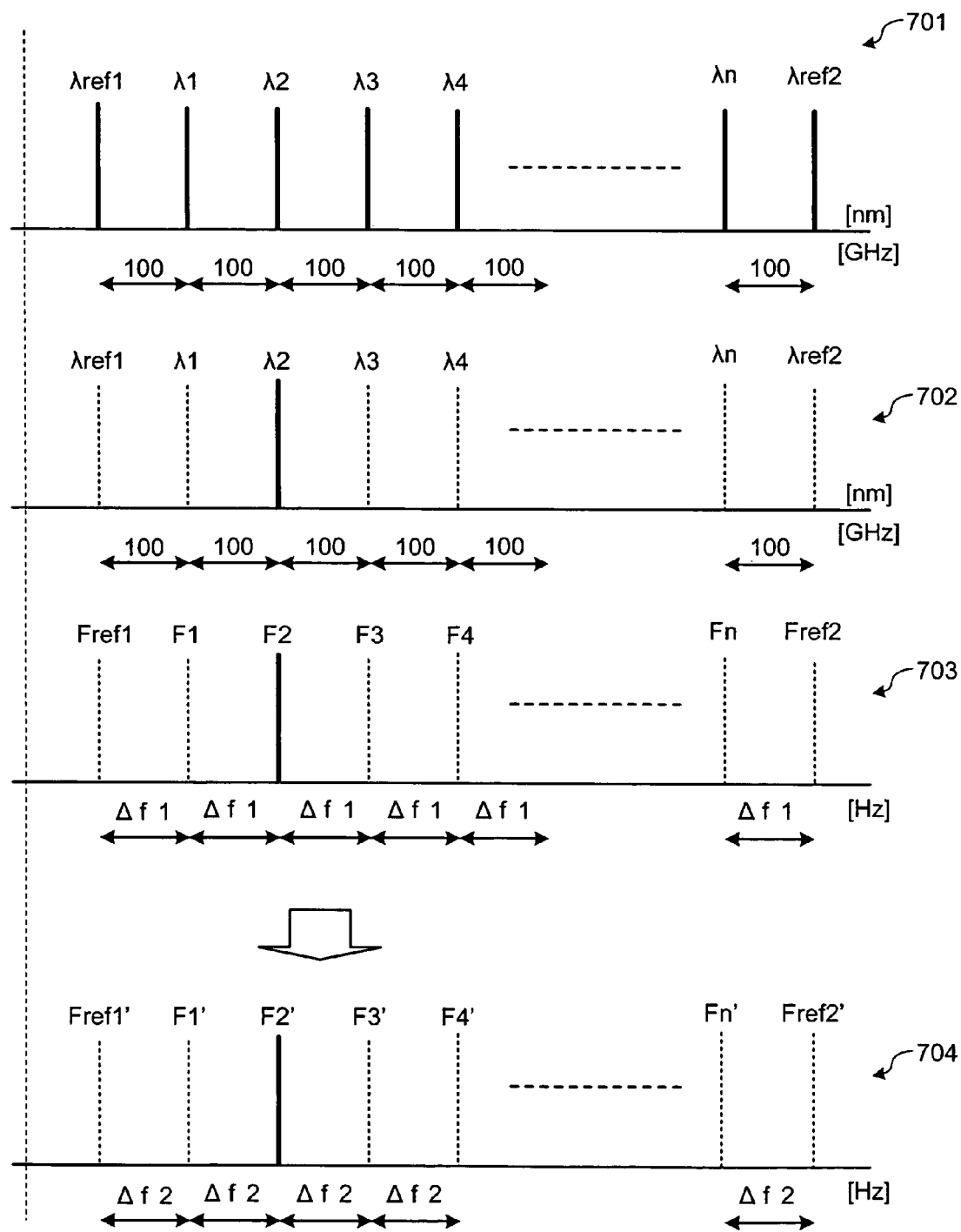
FIG. 7 is a schematic for illustrating temperature-dependent frequency-pulling effect.

FIG. 6 is a flowchart of the wavelength selection by the AOTF control device 100 according to the embodiments of the present invention. The WDM transmission signal (λ1 to λn) input through the WDM-signal input port In is split into four signals to be input to the ports 1 to 4. To the port 5, the reference light having an arbitrary reference wavelength λref1 is input.

Under such a condition, fixed values and variables for performing the wavelength selection are prepared in a memory of the DSP 105 (step S601). Specifically, the fixed values are as follows:

a: a value of the frequency interval ΔF when the temperature of the AOTF 101 is 0° C.;

b: a coefficient of a slope in a characteristic line of the frequency interval ΔF when the temperature of the AOTF 101 changes for 1° C.; and λref: a frequency of the reference light (hereinafter, "reference wavelength").

The variables are as follows:

$T_{AOTF}$: a current temperature of the AOTF 101 (measured value);

Fref: a current frequency of the RF signal corresponding to the reference frequency (measured value); and λx: a wavelength to be selected (input value).

Then, while decreasing a frequency of the RF signal to be input to the port 5 from 180 MHz by 1 kHz, the optical monitor 103 monitors the signal and reads values. Thus, a frequency Fref of the RF signal causing the AOTF to output the reference signal having the reference wavelength λref is detected (step S602). To detect the reference wavelength λref, a maximum value in the values read at monitoring while decreasing the frequency of the RF signal is detected, and a frequency of the RF signal at the time when the maximum value is read is determined as the frequency Fref to obtain the reference wavelength λref.

The frequency Fref detected at step S602 is stored in the memory of the DSP 105 (step S603). To maintain an optimal frequency of the RF signal corresponding to variation due to a change in ambient temperature or fluctuations in the reference wavelength, an optimal power of the RF-signal at which the value read by the optical monitor 103 becomes the maximum value is obtained. The optimal power can be obtained by performing a frequency tracking and a power tracking of the RF signal (step S604). Thus, the frequency of the RF signal to obtain the current reference wavelength is always updated to a latest value by the frequency tracking process.

Moreover, when the frequency Fref is updated, the temperature $T_{AOTF}$ of the AOTF 101 is monitored and stored in the memory of the DSP 105 (step S605). In other words, the temperature $T_{AOTF}$ is also always updated to a latest value.

Then, the frequency interval ΔF of the RF signals to output the optical signals arranged at the intervals of 100 GHz at a current state is calculated from Eq. 1 below (step S606).

$$\Delta F = a + b \times T_{AOTF} \tag{1}$$

Then, it is determined whether the wavelength selection is requested (step S607). When the wavelength selection is not requested ("NO" at step S607), the process is suspended to be stand-by. When the wavelength selection is requested ("YES" at step 607), a frequency Fx of the RF signal that corresponds to a wavelength to be selected is calculated (step S608). The frequency Fx is calculated from Eq. 2 based on parameters of the fixed values and the variables that have been prepared at step S601, and the frequency Fref and the temperature $T_{AOTF}$ that are updated at steps S602 to S605.

$$Fx = Fref + \Delta F \times (\lambda ref - \lambda x)/0.8 \tag{2}$$

The frequency Fx calculated and the optimal power level of the RF-signal obtained through the power tracking process are output to the AOTF 101 to selectively output the wavelength requested (step S609).

Finally, it is determined whether to end the wavelength selection (step S610). When the wavelength selection is to be ended ("YES" at step S610), the process is finished. When the wavelength selection is to be repeated ("YES" at step S610), the process returns to step S601 to repeat the same processes. Thus, the wavelength selection can be performed again while updating information corresponding to a change in the temperature.

As described above, according to the AOTF control device and the method of selecting a wavelength, it is possible to achieve accurate wavelength selection for outputting a desirable optical signal with a single reference light source by using predetermined fixed values and variables.

Since the wavelength selection can be performed with only one reference light source, it is also possible to reduce a size of a device and cost for manufacturing the device. Moreover, since the frequency of the RF signal for selecting a desirable wavelength is acquired by calculation, an arbitrary wavelength can be selected easily and freely without being limited to a wavelength of a fixed channel in the WDM.

The method of selecting a wavelength explained in the embodiments of the present invention is implemented by executing a computer program, which is prepared in advance, by a computer such as a personal computer and a workstation. The computer program is recorded on a computer-readable recording medium, such as a compact-disk read-only memory the (CD-ROM), a magneto-optical disk (MO), and a digital versatile disk (DVD), and is executed by the computer reading out from the recording medium. The computer program may be a transmission medium that is distributed through a network such as the Internet.

According to the present invention, it is possible to achieve highly accurate wavelength selection capable of coping with a temperature change with a single reference-wavelength light.

Moreover, according to the present invention, it is possible to downsize a device and reduce manufacturing cost of the device.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus for controlling an acousto-optic tunable filter including a plurality of input ports for a reference signal and a wavelength-division-multiplexed signal, and a plurality of output ports for the reference signal and a drop signal dropped from the wavelength-division-multiplexed signal, the apparatus comprising:

a radio-frequency-signal generator that generates a radio-frequency signal;

an optical monitor that monitors a first intensity of the reference signal and a second intensity of the drop signal output from the output ports; and a field-programmable gate array that includes a reference-frequency determining unit that determines, based on the first intensity, a first frequency of the radio-frequency signal that causes the acousto-optic tunable filter to output the reference signal;

a temperature detecting unit that detects a temperature of the acousto-optic tunable filter;

a frequency calculating unit that calculates a second frequency of the radio-frequency signal that causes the acousto-optic tunable filter to output a drop signal of a desired wavelength based on the second intensity, the first frequency, the temperature detected, and a temperature-dependent output characteristic of the acousto-optic tunable filter measured in advance; and a control unit that controls the radio-frequency-signal generator to generate the radio-frequency signal of the second frequency calculated.

2. The apparatus according to claim 1, wherein the acousto-optic tunable filter outputs a plurality of drop signals having a fixed wavelength interval corresponding to a plurality of radio-frequency signals having a fixed frequency interval, a change of the fixed frequency interval is proportional to a change of the temperature, and the frequency calculating unit includes an interval calculating unit that calculates the fixed frequency interval based on the temperature detected, and calculates the second frequency based on the fixed frequency interval calculated, the second intensity, a wavelength of the reference signal, and the first frequency.

3. The apparatus according to clam 1, wherein the temperature detecting unit detects the temperature in a repeated manner, the optical monitor detects the second intensity in a repeated manner, and the frequency calculating unit calculates the second frequency in a repeated manner.

4. The apparatus according to claim 1, wherein the acousto-optic tunable filter, the input ports, and the output ports are integrated on a single substrate.

5. The apparatus according to claim 1, further comprising a demultiplexer that demultiplexes the wavelength-division-multiplexed signal into a plurality of optical signals having different wavelengths, wherein each of the optical signals is input to a corresponding input port.

6. A method of selecting wavelength by controlling an acousto-optic tunable filter, the acousto-optic tunable filter including a plurality of input ports for a reference signal and a wavelength-division-multiplexed signal, and a plurality of output ports for the reference signal and a drop signal dropped from the wavelength-division-multiplexed signal, the method comprising:

generating a radio-frequency signal;

monitoring a first intensity of the reference signal and a second intensity of the drop signal output from the output ports;

determining, based on the first intensity, a first frequency of the radio-frequency signal that causes the acousto-optic tunable filter to output the reference signal;

detecting a temperature of the acousto-optic tunable filter;

calculating a second frequency of the radio-frequency signal that causes the acousto-optic tunable filter to output a drop signal of a desired wavelength based on the second intensity, the first frequency, the temperature detected, and a temperature-dependent output characteristic of the acousto-optic tunable filter measured in advance; and generating the radio-frequency signal of the second frequency calculated.

* * * * *